(12) United States Patent
Garcia Redondo et al.

(10) Patent No.: US 12,474,995 B2
(45) Date of Patent: *Nov. 18, 2025

(54) CHECKPOINT-PROGRESS STATUS

(71) Applicant: Arm Limited, Cambridge (GB)

(72) Inventors: Fernando Garcia Redondo, Cambridge (GB); Jonas Švedas, Cambridge (GB); Sahan Sajeewa Hiniduma Udugama Gamage, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,614

(22) Filed: May 12, 2023

(65) Prior Publication Data
US 2023/0376381 A1 Nov. 23, 2023

(30) Foreign Application Priority Data
May 17, 2022 (GB) ...................................... 2207197

(51) Int. Cl.
*G06F 11/00* (2006.01)
*G06F 1/30* (2006.01)
*G06F 11/14* (2006.01)
*G06F 13/28* (2006.01)

(52) U.S. Cl.
CPC ............ *G06F 11/1407* (2013.01); *G06F 1/30* (2013.01); *G06F 11/1438* (2013.01); *G06F 13/28* (2013.01)

(58) Field of Classification Search
CPC .... G06F 11/1407; G06F 1/30; G06F 11/1438; G06F 13/28
See application file for complete search history.

(56) References Cited

U.S. PATENT DOCUMENTS

| | | | | |
|---|---|---|---|---|
| 7,921,328 | B1* | 4/2011 | Gulati | G06F 11/2074 714/15 |
| 9,684,538 | B1* | 6/2017 | Liu | G06F 17/16 |
| 10,289,549 | B1* | 5/2019 | Shilane | G06F 12/0891 |
| 11,269,737 | B2* | 3/2022 | Watt | G06F 11/076 |
| 2009/0164743 | A1* | 6/2009 | Yoshii | G06F 1/30 711/E12.103 |
| 2010/0228402 | A1* | 9/2010 | Mangione-Smith | G06F 1/28 700/292 |

(Continued)

FOREIGN PATENT DOCUMENTS

GB 2591813 A 8/2021

OTHER PUBLICATIONS

Proceedings of the ACM on Interactive, Mobile, Wearable and Ubiquitous Technologies, vol. 4, No. 3, 2020, De Winkel et al., "Battery-Free Game Boy", pp. 1-34.

(Continued)

*Primary Examiner* — Loan L.T. Truong
(74) *Attorney, Agent, or Firm* — NIXON & VANDERHYE P.C.

(57) ABSTRACT

A method comprising, in response to a power-drop warning, beginning a checkpointing process comprising storing, to a non-volatile memory, execution state associated with data processing operations performed by data processing circuitry. The method also comprises maintaining, in the non-volatile memory, a checkpoint-progress indication to indicate which of multiple sections of the execution state have been stored as part of the checkpointing process.

17 Claims, 9 Drawing Sheets

(56) References Cited

U.S. PATENT DOCUMENTS

| | | | | |
|---|---|---|---|---|
| 2011/0001485 | A1* | 1/2011 | Feight | H02J 1/10 |
| | | | | 307/43 |
| 2011/0134674 | A1* | 6/2011 | Ivanov | H02M 7/219 |
| | | | | 363/127 |
| 2014/0075233 | A1* | 3/2014 | Bartling | G06F 3/0679 |
| | | | | 713/324 |
| 2014/0215103 | A1* | 7/2014 | Cohen | G06F 13/28 |
| | | | | 710/23 |
| 2015/0097607 | A1 | 4/2015 | Wang | |
| 2015/0127910 | A1* | 5/2015 | Ghai | G06F 11/14 |
| | | | | 711/141 |
| 2016/0378169 | A1* | 12/2016 | Naeimi | G06F 1/263 |
| | | | | 713/323 |
| 2018/0088916 | A1* | 3/2018 | Baghsorkhi | G06F 8/433 |
| 2020/0233475 | A1* | 7/2020 | Galbraith | G06F 11/1407 |
| 2020/0326889 | A1* | 10/2020 | Norman | G06F 11/1068 |
| 2021/0365092 | A1* | 11/2021 | Ruppel | G06F 11/2051 |
| 2022/0165167 | A1* | 5/2022 | Cao | G08G 5/55 |
| 2022/0382637 | A1* | 12/2022 | Balasubramanian | |
| | | | | G06F 11/1464 |
| 2023/0046064 | A1* | 2/2023 | Savanth | G06F 1/3296 |
| 2023/0359260 | A1* | 11/2023 | Gamage | G06F 1/28 |

OTHER PUBLICATIONS

2021 Design, Automation & Test in Europe Conference & Exhibition, 2021, Zhang et al., "Intermittent Computing with Efficient State Backup by Asynchronous DMA", pp. 543-548.

Balsamo, Domenico et al., "Hibernus: Sustaining Computation during Intermittent Supply for Energy-Harvesting Systems", 2014 IEEE.

Balsamo, Domenico et al., "Hibernus++: A Self-Calibrating and Adaptive System for Transiently-Powered Embedded Devices", IEEE Transactions on Computer-Aided Design of Integrated Circuits and Systems, 2015.

Winkel, Jasper De et al., "Battery-Free Game Boy", Proc. ACM Interact. Mob. Wearable Ubiquitous Technol., vol. 4, No. 3, Article 111. Publication date: Sep. 2020.

Lukosevicius, Giedrius et al., Using Sleep States to Maximize the Active Time of Transient Computing Systems, ENSsys'17, Nov. 5, 2017, Delft, Netherlands.

* cited by examiner

CHECKPOINT-PROGRESS STATUS

CROSS-REFERENCE TO RELATED APPLICATIONS

This application claims priority pursuant to 35 U.S.C. 119(a) to British Application No. 2207197.1, filed May 17, 2022, which application is incorporated herein by reference in its entirety.

FIELD

The present technique relates to the field of data processing.

BACKGROUND

In some data processing systems, power is supplied from a source which may not always provide a reliable, constant power level. In such systems—referred to as intermittent computing systems or intermittent computing devices—the power supplied to the processing circuitry may vary, and may occasionally drop below some threshold level, below which for the data processing circuitry may be unable to perform some or all of its usual functions. This event is sometimes referred to a brownout, and risks corruption of any data stored in volatile memory.

SUMMARY

Viewed from a first example of the present technique, there is provided a method comprising:
  in response to a power-drop warning, performing a checkpointing process comprising storing, to a non-volatile memory, execution state associated with data processing operations performed by data processing circuitry; and maintaining, in the non-volatile memory, a checkpoint-progress status to indicate which of multiple sections of the execution state have been stored as part of the checkpointing process.

Viewed from another example of the present technique, there is provided a computer program which, when executed on a computer, causes the computer to perform the above method.

Viewed from another example of the present technique, there is provided a storage medium storing the above computer program. The storage medium may be a non-transitory storage medium.

Viewed from another example of the present technique, there is provided an apparatus for intermittent computing, the apparatus comprising:
  data processing circuitry to perform data processing operations; and
  checkpointing circuitry to perform, in response to a power-drop warning, a checkpointing process comprising storing, to a non-volatile memory, execution state associated with the data processing operations performed by the data processing circuitry,
  wherein the checkpointing circuitry is configured to maintain, in the non-volatile memory, a checkpoint-progress status to indicate which of multiple sections of the execution state have been stored as part of the checkpointing process.

BRIEF DESCRIPTION

Further aspects, features and advantages of the present technique will be apparent from the following description of examples, which is to be read in conjunction with the accompanying drawings, in which.

DETAILED DESCRIPTION

Figure 1:
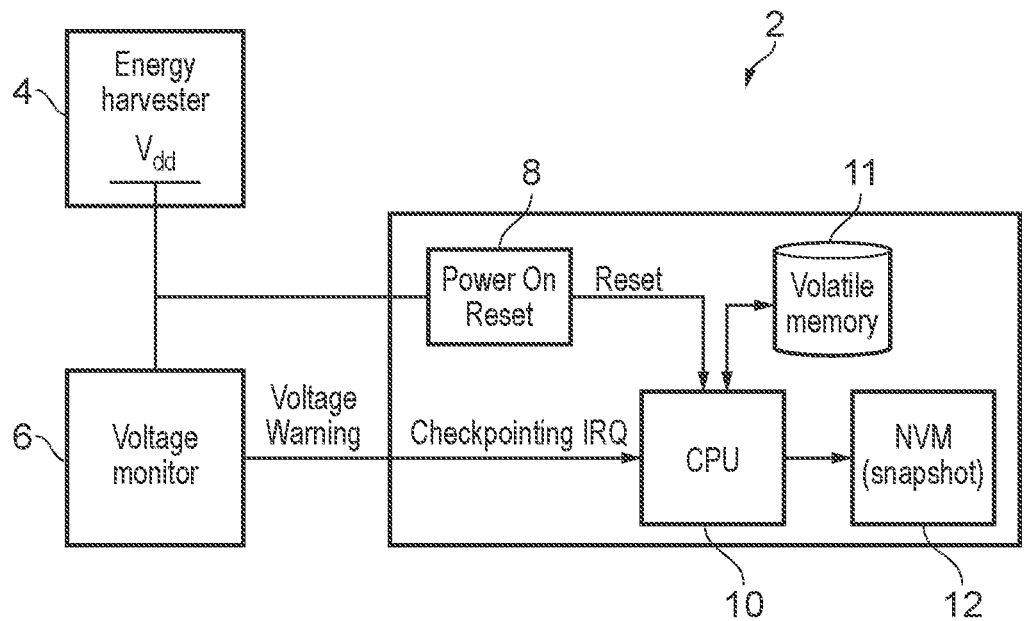
FIG. 1 is a schematic illustration of an intermittent computing system.

Before discussing example implementations with reference to the accompanying figures, the following description of example implementations and associated advantages is provided.

In accordance with one example configuration there is provided a method comprising, in response to a power-drop warning, performing a checkpointing process comprising storing, to a non-volatile memory, execution state associated with data processing operations performed by data processing circuitry. The method also comprises maintaining, in the non-volatile memory, a checkpoint-progress status to indicate which of multiple sections of the execution state have been stored as part of the checkpointing process.

Many data processing systems—including many intermittent computing systems—store data such as execution state (e.g. any data associated with data processing operations performed by the data processing circuitry (also referred to as processing circuitry), such as data held in registers and the stack) associated with data processing operations in volatile data storage. Volatile data storage (also referred to as volatile memory) requires power to store data, and hence any data stored in volatile memory is lost if the power supply to the volatile memory drops below a given level (e.g. this could be a power level below which some or all of the data processing operations can no longer be performed by the data processing circuitry).

One might think that a solution to this problem is to store the execution state in non-volatile memory, which does not require a power supply to store data (and hence can safely store data even if a brownout occurs, for example). However, non-volatile memory can be very expensive (e.g. in terms of latency and power consumption) to access. Hence, especially for rapidly changing data such as execution state, the cost of repeatedly accessing non-volatile memory to read and write execution state may be considered unacceptably high.

A compromise, which provides the advantages of using volatile memory to store execution state, while still providing some protection against data loss in the event of a brownout, is to perform a checkpointing process. A checkpointing process involves storing, to non-volatile memory (e.g. non-volatile storage or non-volatile data storage), a snapshot of the current execution state (e.g. this could be a copy of some or all of the execution state currently stored in volatile memory). If a brownout occurs at some point, once power is restored, data processing can resume from the point at which the checkpointing process was performed, by restoring the saved execution state from the non-volatile memory.

For example, a checkpointing process could be performed periodically. In the present technique, however, the checkpointing process is performed in response to a power-drop warning (e.g. indicating that the power supply (or some related variable, such as voltage) has dropped below some threshold level). The power-drop warning may, therefore, be used as a prediction that a brownout is expected to occur. It should be noted, however, that it is possible for the system to periodically perform the checkpointing process, in addition to performing the checkpointing process in response to the power-drop warning.

The checkpointing process is expensive, given that it involves accessing the NVM, and may also require the CPU to interrupt its normal operation to perform the checkpointing process. While this expense is often considered to be justified, given the potential loss of performance and increased power consumption associated with repeating processing due to loss of the execution state following a power loss, the inventors realised that it would be advantageous to be able to perform a partial checkpointing process, in which not all of the execution state needs to be stored to the non-volatile memory every time the checkpointing process is performed.

A challenge to solving this problem, however, is that typical systems typically consider a snapshot (e.g. a copy of execution data stored in the non-volatile memory) in its entirety—for example, a snapshot may be marked as valid or invalid depending on whether or not a checkpointing process was able to complete. Hence, in a conventional system, one would expect a partial checkpointing process (e.g. one that was interrupted by a power loss event) to result in an invalid snapshot being saved, and hence would expect that such a process would be useless.

In the present technique, a checkpointing-progress status is provided in non-volatile memory, that indicates the progress of the checkpointing process. More particularly, the execution state to be stored during the checkpointing process is split into multiple sections, and the checkpointing-progress status indicates which of the multiple sections have successfully been stored (e.g. completely/successfully stored) to the non-volatile memory.

The inventors realised that splitting the execution state to be stored during the checkpointing process into multiple (e.g. two or more) sections and maintaining a checkpoint-progress status (e.g. a checkpoint-progress indication) in this way can be advantageous for a number of reasons. For example, it can allow a partial checkpointing process to be performed, in which a usable (partial) snapshot is stored, even if the checkpointing process is unable to complete. For example, since the execution state is split into sections, each section could be marked as valid or invalid independently of every other section. This can improve performance, for example if it enables processing to restart at a later point than if no usable snapshot was stored. This approach also provides some protection against brownouts that occur more quickly than expected (e.g. if the power drops at a faster rate than expected), since it increases the likelihood that at least some usable execution state will be stored. These are just some example applications of the present technique to improve the performance and/or reduce the power consumption of a data processing system. Further examples of the situations in which the present technique can be applied will be discussed below.

In some examples the method comprises, in response to a power-restore signal, restoring the sections of the execution state that have been stored as part of the checkpointing process.

This allows some of the progress that was made during the data processing operations performed prior to a brownout to be maintained, even if the checkpointing process was not able to complete. This can improve the performance of a system implementing this method, because it reduces the number of operations that need to be re-executed after recovering from a brownout.

The method of the present technique can be hardware-implemented or software-implemented.

In some examples, the checkpoint-progress status is maintained in the non-volatile memory by the data processing circuitry executing checkpointing software.

In such examples, the method of the present technique can be considered to be software-implemented (e.g. software-controlled).

In some alternative examples, the checkpointing process is performed by checkpointing circuitry, and the checkpoint-progress status is updated in the non-volatile memory by the checkpointing circuitry.

In such examples, the method of the present technique can be considered to be hardware-controlled (e.g. hardware-implemented). For example, the checkpointing circuitry could be dedicated circuitry, configured to perform the checkpointing process. In a hardware-controlled example, the hardware may nevertheless operate based on configuration data set by software executing on data processing circuitry.

In some examples, the checkpointing circuitry comprises a multi-channel direct memory access (DMA) controller, and the method comprises configuring the multi-channel DMA controller to perform the checkpointing process, and allocating memory storing operations corresponding to at least two of the multiple sections of the execution state to different channels of the multi-channel DMA controller.

For example, the DMA controller may be configured by the data processing circuitry, which may also be responsible for allocating the memory storing operations to the channels of the DMA controller. When a multi-channel DMA controller is used, memory accesses (including those associated with the checkpointing process) can be issued for more than one channel at a time—this enables performance to be improved because while the DMA is waiting for data to be returned in response to a read request issued for one channel of DMA transfer, it can be requesting memory operations for another channel. However, it should be noted that a single-channel DMA controller could also be used (e.g. the checkpointing circuitry could comprise a single-channel DMA controller instead of a multi-channel DMA controller).

In some examples the method comprises, in response to a power-restore signal, triggering the data processing circuitry to resume processing from an execution restart address, wherein the execution restart address comprises one of a plurality of possible execution restart addresses, each corresponding to completing storing of a different section of the execution state to the non-volatile memory.

It can be useful to define an execution restart address that is restored following receipt of a power-restore signal, so that processing can resume from a defined point (e.g. rather than resuming from some default restart point, which might lead to some processing being duplicated) if the power-restore signal is received after a power-drop warning is received (e.g. the power-restore signal could be triggered by a detection that a voltage level has risen above some threshold value). In this particular example, the execution restart address used for resuming processing is dependent on which sections of the execution state that have been stored to the non-volatile memory during the checkpointing process. For example, the updated restart point could be a point at which further execution relies on the execution state saved as part of the given section. Hence, setting the execution restart address to different values depending on which sections of the execution state have been stored allows the number of operations that need to be re-executed on restart to be reduced, leading to an improvement in performance.

In some examples, the method comprises storing the execution restart address in the non-volatile memory during the checkpointing process.

In some data processing systems, if processing is interrupted for any reason, a return address may be stored within the execution state (e.g. to a link register) to indicate the point which processing should return to after the interrupt has been processed. This can include when processing is interrupted following receipt of the power-drop warning. Hence, if the power-restore signal is received after a power-drop warning is received but before a brownout occurs (e.g. if a predicted brownout does not occur), the return address could, in some examples, be read from volatile data storage (such as a link register) accessible to the data processing circuitry. However, if a brownout does occur before the power-restore signal is received, the execution state—including the return address—may be erased (or become corrupted) from volatile storage structures such as the link register. Hence, it can be useful in some examples to store the execution restart address in the non-volatile memory. In this way, if a brownout does occur, the execution restart address can still be recovered from the non-volatile memory, allowing execution to restart from a defined point.

In some examples, the method comprises updating the execution restart address in the non-volatile memory following completion of storing of each of at least two of the multiple sections of the execution state to the non-volatile memory.

This provides a mechanism for setting the execution restart address in dependence on which sections of the execution state have been stored to the non-volatile memory. The execution restart address may be updated under the control of software, or under the control of hardware such as a DMA controller (for example, if a multi-channel DMA controller is used in the manner discussed above, each channel could be configured to write a corresponding execution restart address to the non-volatile memory once it has completed its assigned memory storing operations), or any other circuit logic responsible for orchestrating and monitoring the checkpointing process.

In some examples, the checkpoint-progress status comprises the execution restart address.

There are many different forms that the checkpoint-progress status can take. However, in this example, the checkpoint-progress status is the execution restart address (e.g. a separate checkpoint-progress status does not need to be maintained in addition to the execution restart address). This can be a particularly efficient way to implement the present technique, since it avoids the need for additional logic or software instructions to implement both the execution restart address and a separate checkpoint-progress status.

However, it will be appreciated that this is just one example of how the checkpoint-progress status could be implemented. For example, it is also possible for the checkpoint-progress status to be separate from the execution restart address; for example, it could be an address of the latest data stored to the non-volatile memory; section identifiers (section IDs) of the sections of the execution state that have so far been stored to the non-volatile memory (or a bitmap of the section IDs, to save storage space), or a fraction (e.g. a percentage or a count) of the number of cache lines of execution state that have been stored to the non-volatile memory so far.

In some examples, the method comprise determining the execution restart address by looking up an entry of a lookup table based on the checkpoint-progress status.

In this example, the execution restart address and the checkpoint-progress status are separate values, and the checkpoint-progress status is used to identify the execution restart address in a lookup table (LUT) in the non-volatile memory. This can be an efficient way to determine the execution restart address, but it does require two separate values (the execution restart address and the checkpoint-progress status) to be maintained in the non-volatile memory. The LUT may be stored in the non-volatile memory in advance and does not need to be written at the time of performing the checkpointing. The lookup of the LUT could, for example, be performed at the time of restoring the execution state saved during the checkpointing process (e.g. in response to the power-restore signal). This approach is advantageous because it can reduce the number of writes to the non-volatile memory that are performed during the checkpointing process (when time and energy may be scarce), as it is not necessary to write the restart addresses to the non-volatile memory. The LUT could be stored in the non-volatile memory in advance, in which case at least one read of the LUT (based on the checkpoint-progress indication) can be performed to obtain the execution restart address (which could then be stored to volatile storage accessible to the processing circuitry, for example), rather than updating the execution restart address in the non-volatile memory throughout the checkpointing process. For example, the LUT could be pre-defined (e.g. already stored in the non-volatile memory before the power-drop warning is received). It is also possible for the LUT to be accessed in volatile memory during the restoration process (e.g. it could be part of the execution state restored in respond to the power-restore signal).

In some examples, the method comprises determining, based on the checkpoint-progress status, whether storing of one or more of the multiple sections of the execution state can be omitted from a further checkpointing process performed in response to a further power-drop warning.

In this example, dividing the execution state to be stored to the non-volatile memory into sections and maintaining the checkpoint-progress indication to indicate which of the sections have been stored can allow a subsequent checkpointing process (e.g. performed in response to a subsequent power-drop warning after execution has resumed on the data processing circuitry) to omit storing some or all of the sections that were stored during a previous checkpointing process. This can reduce the amount of data that needs to be stored to the non-volatile memory during the further checkpointing process, which can reduce the power consumption of the system. For example, checkpointing can be an expensive process, since storing a large amount of execution state to the non-volatile memory can be time consuming and can consume a large amount of power. This is due to the fact that accesses to non-volatile memory generally involve high latency (e.g. higher latency than is associated with accesses to volatile memory) and can consume a lot of power (e.g. in comparison with accessing some forms of volatile memory).

In addition, the large amount of execution state to be stored during a typical checkpointing process can exacerbate this issue. Hence, the ability to reduce the amount of execution state to be stored can reduce the total latency and power consumption associated with performing the checkpointing process. This can lead to a decrease in power consumption of the system as a whole, not just because the checkpointing process itself consumes less power, but also because the checkpointing process can end sooner, allowing—for example—the data processing circuitry to be put into a power saving or sleep mode for a longer period of time (e.g. in anticipation of the power supply dropping below a threshold value).

In some examples the method comprises, in response to a power-restore signal, performing a checkpoint-restore process comprising restoring the sections of the execution state that have been stored as part of the checkpointing process, and recording which of the restored sections are updated by the processing circuitry after performing the checkpoint-restore process.

In this example, dividing the execution state to be stored to the non-volatile memory into sections makes it possible to keep a record of which sections of the stored execution state are updated or modified (e.g. which sections of the stored execution state are no longer up to date) following the checkpoint-restore process.

In some examples the method comprises, in response to a further power-drop warning received after the performing the checkpoint-restore process, performing a further checkpointing process, and during the further checkpointing process, omitting storing sections of the execution state that where stored during the checkpointing process and not updated by the data processing circuitry following the checkpoint-restore process.

As explained above, the ability to omit storing of sections of the execution state in a further checkpointing process can reduce the power consumption of the system. In this example, a reduction in the power consumption is achieved while improving the accuracy of the stored execution state by only storing sections of the execution state for which an up-to-date copy is not already stored in the non-volatile memory—e.g. this includes any sections of the non-volatile memory which were not stored during a previous checkpointing process (e.g. because the previous checkpointing process was not able to complete, or because the sections were updated based on data processing which was performed after the previous checkpointing process was performed) and those which were stored but have since been updated in volatile memory.

In some examples, the method is performed on an intermittent computing device.

A particularly advantageous application for the present technique is on an intermittent computing device (also referred to herein as an intermittent computing system or an intermittent computing apparatus), where the power supply may be variable and may occasionally drop below some threshold power level, causing a brownout. In such an environment, performing a checkpointing process allows any execution state in volatile memory to be backed up, in case the power drops below said threshold level, causing the volatile memory to be wiped.

In some examples, the method is performed on a device powered by energy harvested by the device.

For example, the device may be powered based on a solar cell (e.g. solar panel), which harvests energy from the sun (e.g. from photons striking the solar cell). Since the solar flux varies (e.g. due to the amount of cloud cover and the time of day), the power supply from a solar cell can be variable, and hence the present technique can be useful. Another example might be a device which harvests energy using RFID (radio frequency identification) technology.

However, there could also be other reasons why power is intermittent. For example, the intermittent compute system could share a power source with another higher-priority computing system which is to be prioritised for power delivery, so if the power demanded by the higher-priority system is high this may cause insufficient power to be available for the intermittent compute system.

In an example, a computer program is also provided, which can be executed on a computer to cause the computer to perform the method as described above. The computer program can, in some examples, be stored on a storage medium (e.g. a computer-readable storage medium), which can be a transitory storage medium or a non-transitory storage medium.

Particular embodiments will now be described with reference to the figures.

FIG. 1 illustrates an example intermittent computing system 2. The intermittent computing system 2 comprises an energy harvester 4, a voltage monitor 6, Power On Reset (POR) circuitry 8, a CPU (central processing unit) 10, volatile memory 11, and non-volatile memory (NVM) 12. The CPU is an example of (data) processing circuitry. It will be appreciated that other types of processing circuitry could also be provided, e.g. a graphics processing unit (GPU) or neural processing unit (NPU—a type of processor with hardware designed to support machine learning processing such as neural networks). The NVM 12 could use any of a variety of memory storage technologies, e.g. flash memory, ferroelectric RAM, magnetoresistive RAM, phase change memory, etc. Hence, the NVM 12 can be any form of non-volatile storage technology that allows data to be retained even if the voltage falls below the minimum voltage required to guarantee retention of data in the volatile storage 11.

The energy harvester 4 harvests energy from the environment, and outputs an electrical signal having a voltage Vdd. The energy harvester may have some internal energy storage such as a capacitor between the directly harvested energy and the output voltage Vdd. The voltage monitor 6 receives the signal from the energy harvester and monitors the voltage Vdd. When the voltage Vdd reaches a warning threshold the voltage monitor 6 issues a voltage warning signal (also referred to as a voltage drop indication or a power drop indication) (e.g. a Checkpointing interrupt (IRQ)) to the CPU 10. The checkpointing interrupt could be delivered to the CPU 10 either by a dedicated physical wired channel (e.g. an interrupt distribution network), or using a message-signalled interrupt based mechanism where the voltage monitor 6 requests that a memory location is updated, with the CPU 10 monitoring that location to detect the interrupt being signalled. The voltage warning signal indicates that the power harvested by the energy harvester has reached the warning threshold value, and that if the CPU 10 is performing processing operations, then the CPU 10 should perform a checkpointing process to save a snapshot of its state of execution to the NVM 12 in case the harvested power drops below a power level below which the CPU 10 is unable to perform processing operations and execution state stored in volatile memory 11 may be lost (e.g. this could be referred to as a sleep threshold or a minimum power level; note that it may still be possible for the voltage to drop below the "minimum" value (e.g. the minimum power level need not necessarily be zero)—the term "minimum power level" in this context refers to a power level below which some or all of the functions of the CPU 10 and/or other hardware within the intermittent computing apparatus 2 can no longer be performed). Therefore, in response to the voltage warning signal, the CPU 10 stores a snapshot of its state of execution to the NVM 12. The POR circuitry 8 also receives the signal from the energy harvester and monitors the voltage Vdd. When the Vdd reaches a POR threshold, the POR circuitry 8 issues a reset signal to the CPU 10. The reset signal indicates that the voltage has reached a POR threshold, at which there may be sufficient power to restore checkpoint state and continue processing. The CPU 10 restarts processing in response to the reset signal.

Figure 2:
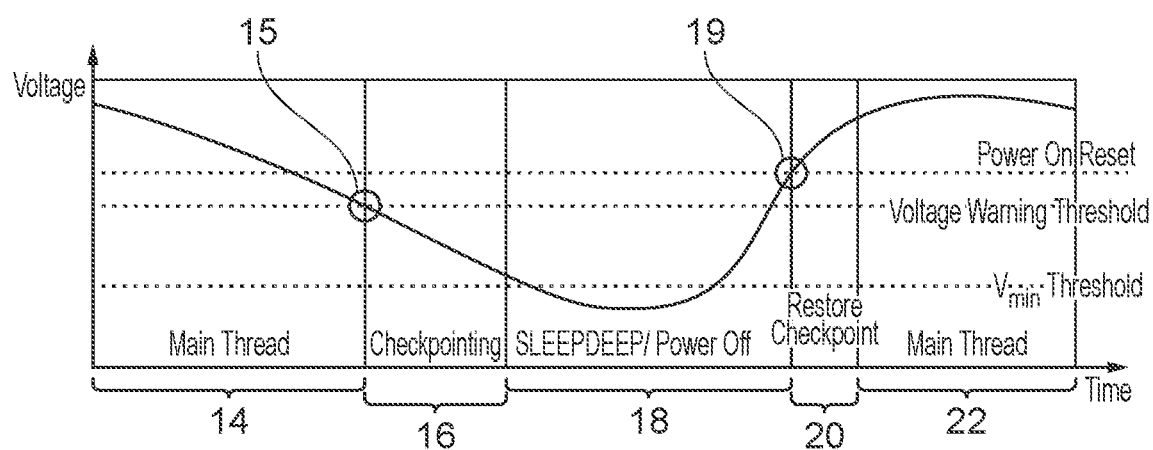
FIGS. 2 and 3 are graphs showing example power cycle sequences for an intermittent computing system.

FIG. 2 illustrates an example power cycle sequence for an intermittent computing system employing dynamic checkpointing. At stage 14, the voltage of the energy harvester output is above the voltage warning threshold. Therefore, at stage 14 the CPU 10 is performing processing operations normally. At stage 15 the voltage has fallen to the voltage warning threshold value. Hence, at stage 15 the voltage monitor 6 issues a voltage warning signal to the CPU 10. Following receiving of the voltage warning signal, at stage 16 the CPU 10 interrupts the main thread of processing being performed at 14, and switches to performing a checkpoint process which saves execution state (e.g. register state and context data in memory) to the NVM 12. Once the CPU 10 has completed the checkpoint process, at stage 18 the CPU goes into a sleep state in which processing operations are not performed. The harvested voltage may drop below the minimum voltage ($V_{min}$) below which the CPU 10 is unable to perform processing operations and volatile memory 11 associated with the CPU 10 may lose any stored information. However, the NVM 12 does not require power to store information and therefore any information stored in the NVM will be retained even if the voltage falls below $V_{min}$. At stage 19, the voltage has increased and reaches the reset voltage. Therefore, at stage 19 the power on reset circuitry 8 issues a reset signal to the CPU 10. After receiving the reset signal, at stage 20 the CPU 10 restores, from the NVM 12, the execution state that was stored at stage 16. By restoring execution state from the NVM, the state stored in volatile memory 11 that was lost when the voltage dropped below $V_{min}$ is restored and processing can continue. Therefore, at stage 22 the CPU 10 performs processing operations normally. By performing such a checkpointing process, progress made by the CPU 10 is not lost when voltage drops below $V_{min}$ and therefore forward computational progress can be maintained.

Note that from the power sequence diagram shown in FIG. 2 the voltage warning threshold is lower than the POR threshold. At the voltage warning threshold, the CPU only needs enough energy to complete a checkpointing routine. After POR, the CPU is also expected to do a checkpoint restoration and some useful work in the main thread, hence the different levels.

On some occasions, during the checkpointing stage 16, the power level may recover due to the energy harvester being able to generate more energy. In this case, the CPU 10 has not been to sleep or lost power, and processing may be able to resume without restoring execution state from the NVM. Given that the CPU does not need enough energy to do a checkpoint restoration, the processing can resume from a lower power level ("Voltage OK") than the POR threshold.

Figure 3:
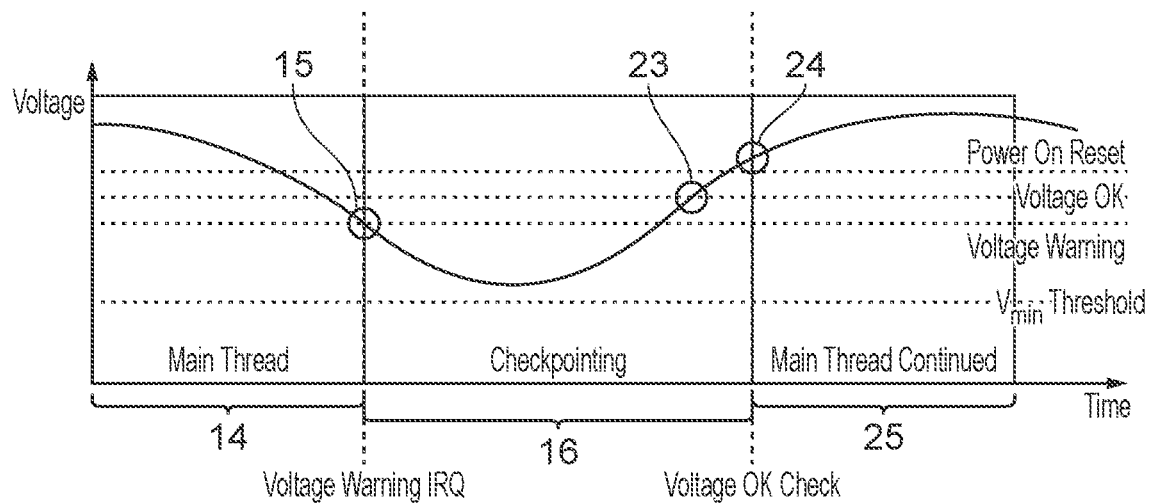

FIG. 3 illustrates a power cycle sequence when the power level recovers during checkpointing. At stage 14 the voltage of the energy harvester output is above the voltage warning threshold and the CPU 10 performs processing operations normally. At stage 15 the voltage reaches the voltage warning threshold value, the voltage monitor 6 issues a voltage warning signal to the CPU 10, and the CPU 10 begins checkpointing. During the checkpointing stage 16, at stage 23 the voltage reaches a voltage OK threshold. At this point, the voltage monitor 6 issues a voltage OK signal to the CPU 10 to indicate that processing may restart. Due to interrupt handling latencies, there may be a lag between the voltage passing the voltage OK threshold and the CPU 10 resuming the main thread of processing at stage 24. At stage 25 the CPU 10 continues processing the main thread without going to sleep or performing a checkpoint restoration routine.

Figure 4:
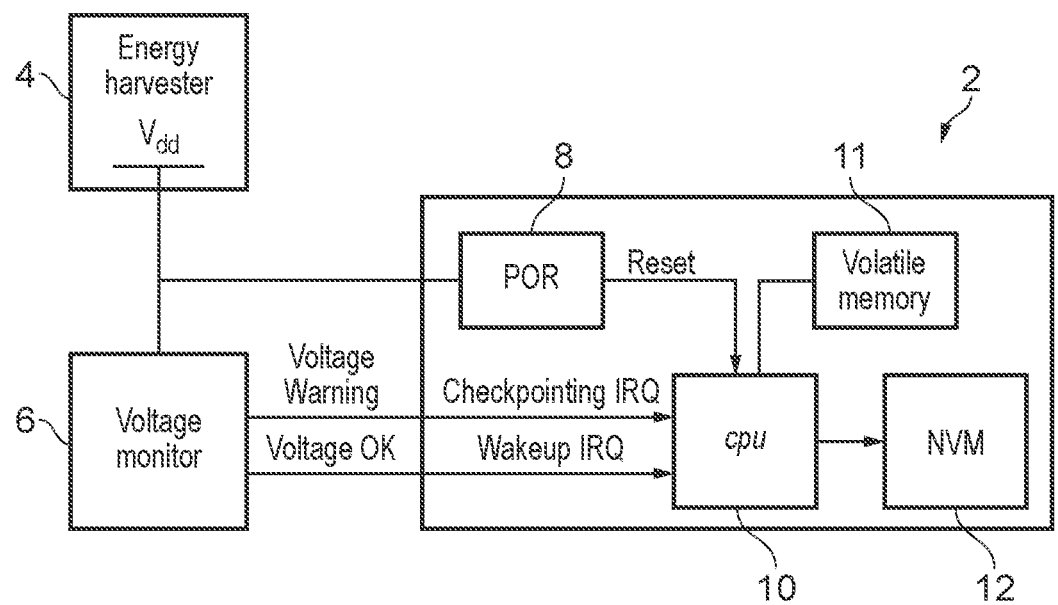
FIG. 4 is another schematic illustration of an intermittent computing system.

FIG. 4 illustrates the example intermittent computing system 2 shown in FIG. 1 adapted to resume processing without sleeping after the voltage reaches the voltage OK threshold. In addition to issuing the voltage warning signal when the voltage reaches a voltage warning threshold, the voltage monitor 6 also issues a voltage OK signal (wakeup interrupt) to the CPU 10 when the voltage reaches a voltage OK threshold. The voltage OK signal indicates that the CPU 10 can resume processing without going to sleep or performing a checkpoint restoration. It will be appreciated that the particular values of detected voltage at which the voltage warning signal, the POR signal and the voltage OK signal are issued may depend on a number of factors specific to a particular implementation.

Figure 5:
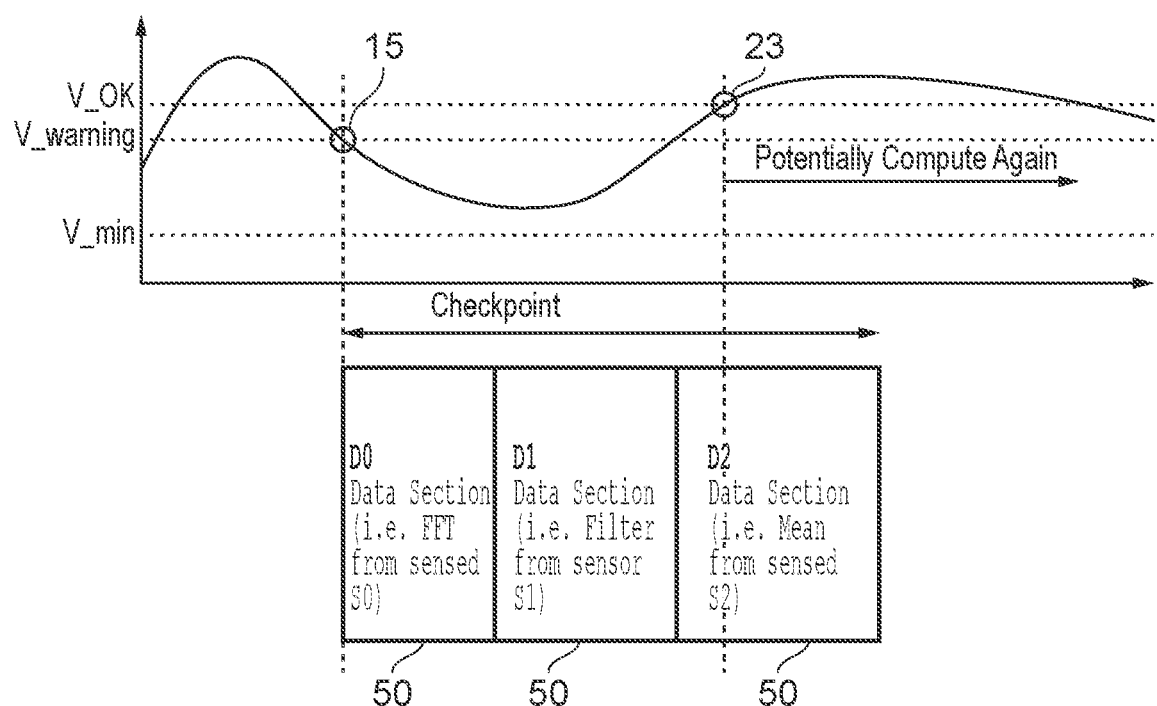
FIGS. 5 to 7 are graphs showing further examples of power cycle sequences for an intermittent computing system.

FIG. 5 is another illustration of a power cycle sequence, showing how the execution state to be saved to the NVM during the checkpointing process may be divided into multiple sections 50. In this particular example, the execution state is divided into three sections: D0, D1 and D2. It will be appreciated that the number of sections is into which the execution state is divided is not limited to three—for example, there could be more or fewer than three sections—and the way in which the execution state is divided is also not limited. For example, FIG. 5 shows a data section D0 corresponding to FFT (fast Fourier transform) calculations from sensor data S0 (e.g. sensor readings, FFT results, and/or any intermediate values), a data section D1 corresponding to a filtering process applied to sensor data S1 (e.g. unfiltered sensor readings, filtered sensor readings and/or information defining the filter applied) and a data section D2 corresponding to calculation of mean values from sensor data S2 (e.g. sensor readings and/or the mean values).

In the power cycle shown in FIG. 5, the power supply recovers to the voltage OK level $V_{OK}$ after the checkpointing process starts, without ever having dipped below the minimum voltage level $V_{min}$. This means that the execution state stored in the volatile memory is maintained (e.g. not erased), and hence that any execution state stored to the NVM need not be restored. In addition, in the example of FIG. 5, the voltage OK level is reached 23 before the checkpointing progress has completed—in particular, data sections D0 and D1 have been completely stored to the NVM by this point, but data section D2 has not been completely stored to the NVM 12. Depending on the particular implementation, the CPU may complete the checkpointing process before resuming execution, so that a valid, complete snapshot of the execution data is stored to the NVM. Alternatively, in order to avoid wasting processing time and reducing the performance of the system, the CPU can be arranged to halt (stop) the checkpointing process once the voltage OK signal is detected.

In some conventional systems, execution state stored in the NVM during the checkpointing process is not marked as valid until the checkpointing process completes (e.g. a "valid checkpoint completed marker" could be stored to the NVM once the process has completed). Hence, if the checkpointing process is halted before it has completed, the execution state stored to the NVM is not marked as valid, meaning that the power consumed while storing sections D0 and D1 (for example) is wasted. However, in the present technique, splitting the execution state into multiple (e.g. a plurality, two or more) data sections allows a checkpoint-progress status to be maintained in the NVM to indicate which sections have been fully stored to the NVM at a given point in time. This, in turn, allows individual sections of the execution state to be marked as valid once completed (e.g. by recording a separate "valid" marker in association with each completed section of the execution state, or by updating a "valid" indicator shared between sections (e.g. a bitmap with bits of 1 indicating completed sections and 0 indicating incomplete sections, or an identifier of the latest section of checkpoint data to have been completed). Hence, even if the checkpointing process is not completed—e.g. because it is halted by the CPU before it has completed—the snapshot has been marked as valid for those sections which were fully stored to the NVM (e.g. sections D0 and D1). Further, as will be seen from the discussion below, splitting the execution state into sections 50 can also be advantageous, even when the checkpointing process is able to complete.

Figure 6:
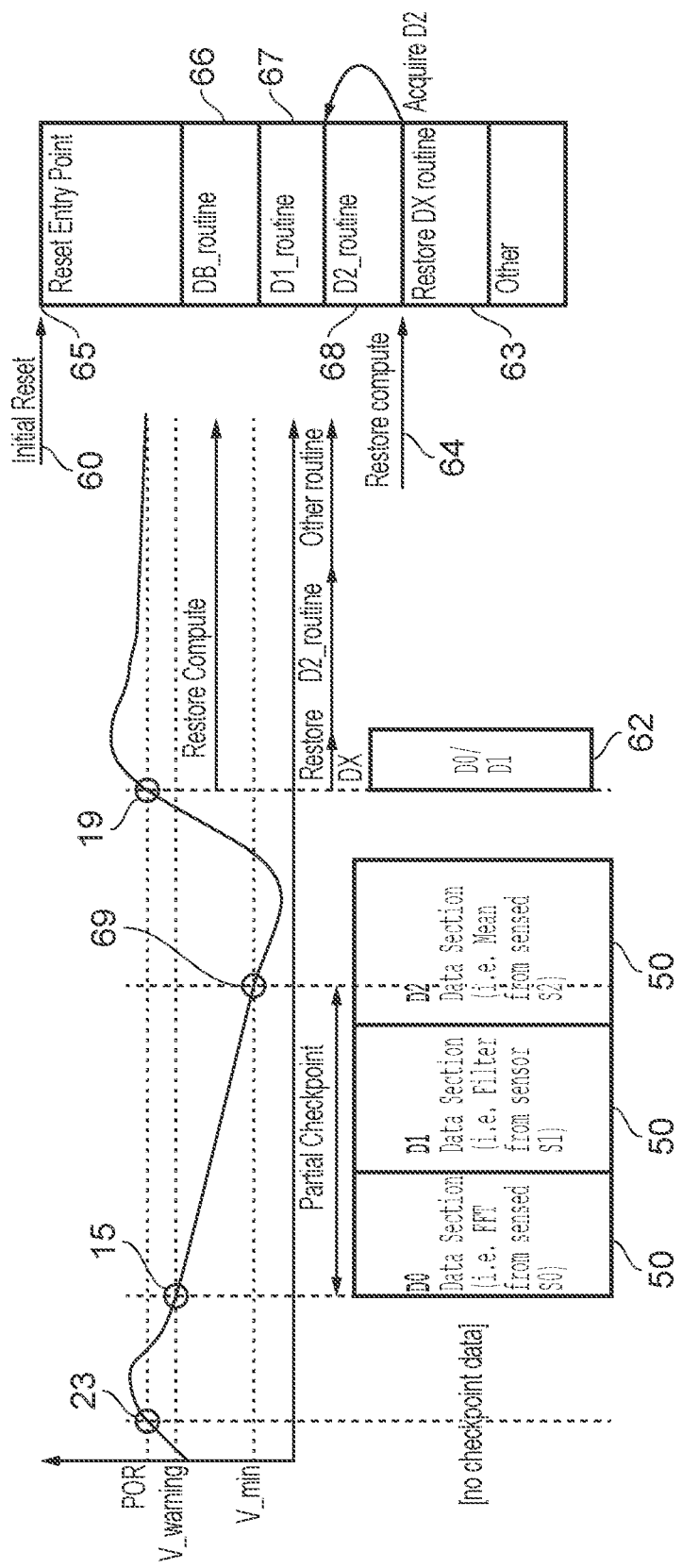

FIG. 6 is another illustration of a power cycle of an intermittent computing apparatus, showing an example application of the present technique. In this example, the power level drops below $V_{min}$ before the checkpointing process has completed. In some conventional systems, this would mean that the entire snapshot saved so far to the NVM would not be marked as valid (as discussed above), and hence once the voltage restore signal (e.g. the POR signal) is received at stage 19, processing would have to restart from some default position (e.g. from the initial reset entry point 60). This would mean that any processing performed prior to the start of the checkpointing process (e.g. prior to the voltage warning indication being detected) would need to be replicated, which can consume a large amount of power and can impact performance (since further processing is unable to take place). However, in the present technique, a snapshot relating to sections D0 and D1 can be indicated as valid in the NVM, since a checkpoint-progress status maintained by the CPU in the NVM indicates that the execution state corresponding to these data sections has been fully stored to the NVM. In particular, the checkpoint-progress status is updated each time a section of the execution state is saved to the NVM (e.g. the checkpoint-progress status is maintained on-the-fly while performing the checkpointing process). Hence, when processing restarts following the POR signal being received, execution state corresponding to data sections D0 and D1 can be restored 62, since the checkpoint-progress status will indicate that a valid snapshot of these data sections has been stored, even if power was lost before the checkpointing process was able to complete. Hence, execution can restart from a later point 64 (e.g. corresponding to the start of execution relating to data section D2). This reduces the amount of computation that needs to be duplicated, leading to reduced power consumption and improved performance.

For example, the right-hand side of FIG. 6 shows an example of program code that is executed by the data processing circuitry. At the time of an initial reset 23, when no checkpoint data is stored, execution begins from a reset entry point 65 indicated by an address 60. In the example of FIG. 6, it is assumed that execution continues with the execution of the D0 routine 66 (e.g. program code corresponding to the data in data section D0), the D1 routine 67 and the D2 routine 68, until the power-drop warning is received at stage 15. When the power-drop warning is received, the partial checkpointing process is performed as discussed above, until the power drops below $V_{min}$, at which point 69 the checkpointing process is halted. Later, once the power is restored to the POR point 19, the execution state in sections D0 and D1 is restored 63, before execution is resumed from a point corresponding to the start of execution relating to data section D2.

To facilitate restarting execution at the later point 64, the checkpointing process might also include updating an execution restart address in the NVM, corresponding to the point from which execution should restart once the POR signal is received. For example, this execution restart address might be updated each time a data section 50 is fully stored to the NVM. In some cases, this execution restart address could itself be the checkpoint progress status (e.g. there may not be a separate checkpoint status stored in the NVM in addition to the execution restart address).

However, in other examples, a separate checkpoint-progress status might be maintained in the NVM in addition to the execution restart address; for example, the checkpoint-progress status could be used to lookup the execution restart address in a lookup table (LUT) in the NVM. If a LUT is used, the execution restart address for each of the sections 66, 67, 68 can be predefined in advance and does not need to be written to NVM during the checkpointing process. Instead, the checkpoint-progress status can be used to index into the LUT and select the correct execution restart address based on which checkpoint sections were successfully completed.

Figure 7:
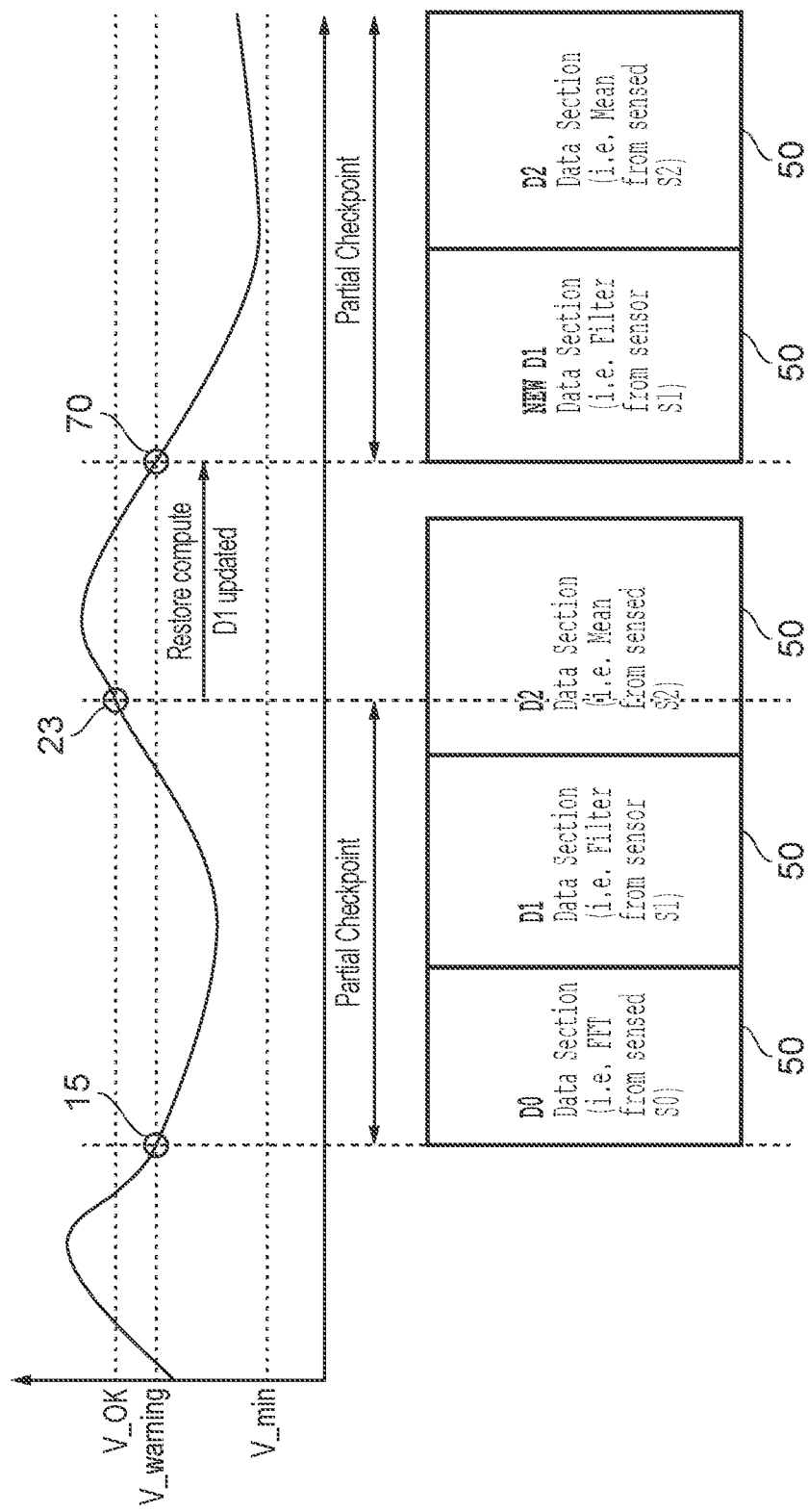

FIG. 7 is another illustration of a power cycle of an intermittent computing apparatus, again showing an example application of the present technique. In this example, the checkpointing process is again interrupted before it completes—in this case, the voltage OK signal is received 23 after both D0 and D1 have been fully saved to the NVM, but part-way through saving D2. In this example, the checkpointing process is halted in response to receiving the voltage OK signal; however, it should be appreciated that in some implementations the checkpointing process may be allowed to complete before resuming computation.

Once computation has resumed—for example, the approach depicted in FIG. 6 could be applied, so that sections D0 and D1 are restored, and computation resumes from a point corresponding to D2—the execution state in data section D1 is updated. The CPU records in the NVM that this data section has been updated. The power level subsequently drops 70 below the warning voltage $V_{warning}$, triggering a further checkpointing process to begin. However, in this case, the execution state in data section D0 does not need to be stored to the NVM, since the checkpoint-progress status maintained in the NVM indicates that D0 was stored during the previous checkpointing process, and this section is not recorded as having been updated since processing resumed. On the other hand, data section D1 has been updated, so is saved to the NVM again. Similarly, D2 was not fully saved during the previous checkpointing process, so needs to be saved to the NVM during the further checkpointing process.

Hence, maintaining a checkpoint-progress indication and also recording which data sections are updated after computation restarts facilitates a reduction in the amount of execution data that needs to be stored during a subsequent checkpointing progress (e.g. since D0 does not need to be stored to the NVM), while also allowing an up-to-date copy of all relevant execution state to be stored to the NVM. Reducing the amount of execution state to be stored to the NVM during the further checkpointing process is advantageous because it reduces the power consumption associated with the further checkpointing process. In addition, reducing the amount of execution state to be stored can reduce the duration of the checkpointing process, increasing the likelihood that it will be able to complete before the voltage drops below $V_{min}$.

Figure 8:
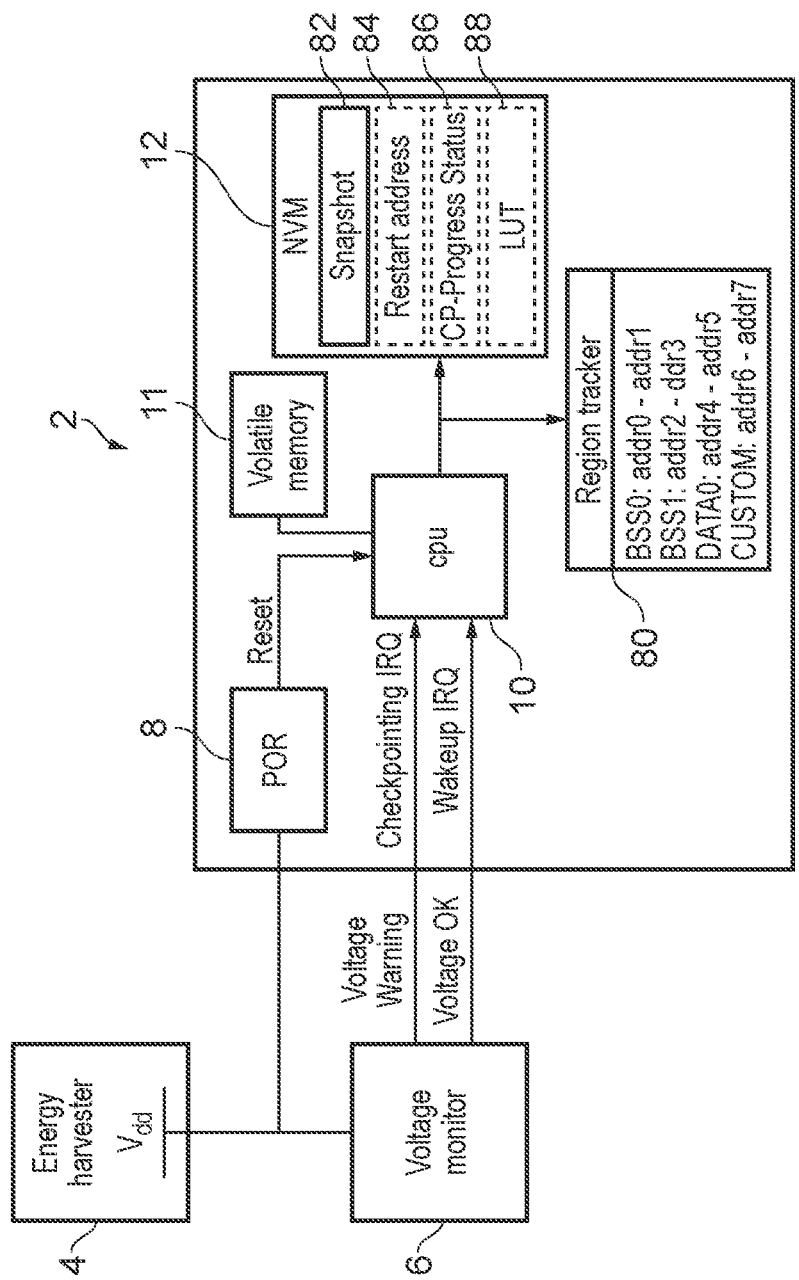
FIGS. 8 and 9 are further schematic illustrations of intermittent computing systems.

FIG. 8 illustrates the example intermittent computing system 2 shown in FIGS. 1 and 4, adapted to perform checkpointing on execution state divided into multiple sections. In addition to the components shown in FIGS. 1 and 4, the intermittent computing apparatus 2 shown in FIG. 8 comprises a region tracker 80, which identifies the execution state belonging to each of the data sections. The region tracker could, for example, be stored in the NVM, or it could be stored in a separate storage structure.

As shown in FIG. 8, the snapshot 82 is stored in the NVM 12. In addition, a checkpoint-progress status (CP-progress status) 86 may be stored in the NVM 12, and an execution restart address 84 may also be stored (however, if the execution restart address is the checkpoint-progress status, then there may not be a separate checkpoint-progress status stored in the NVM). A lookup table (LUT) 88 defining a relationship between the checkpoint-progress status and multiple potential execution restart addresses may also be stored to the NVM 12, in which case the execution restart address 86 would not need to be stored to the NVM 12.

Figure 9:
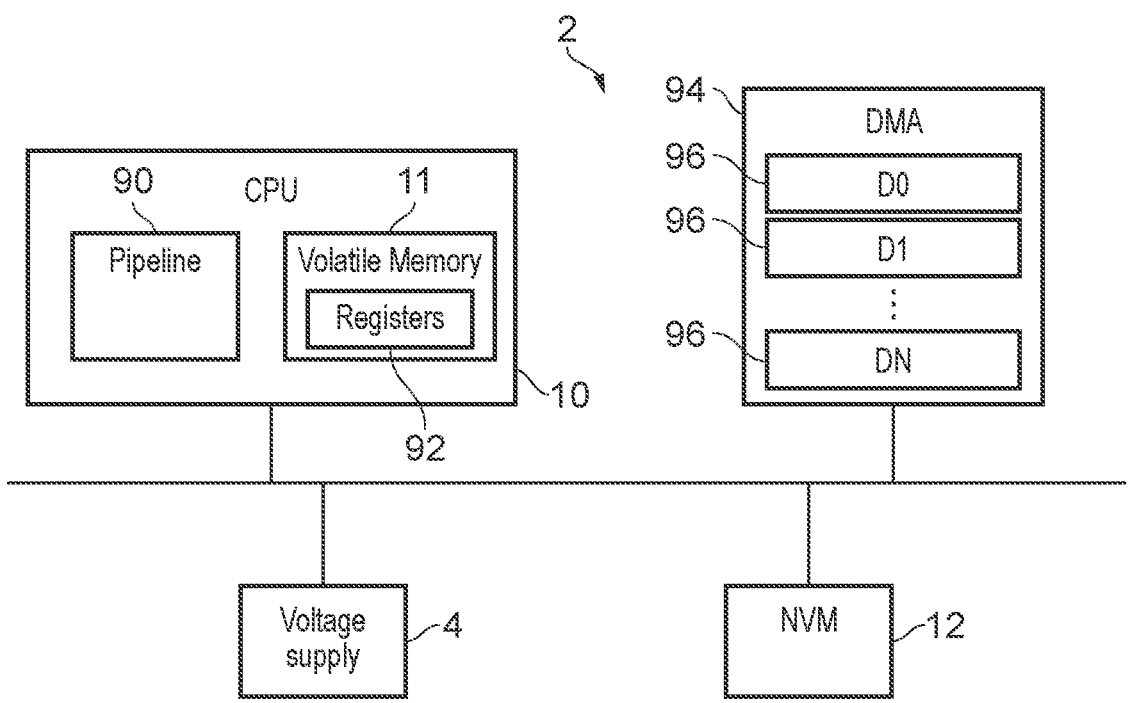

FIG. 9 is another illustration of the intermittent computing system 2. As shown in FIG. 9, the CPU 10 may include a processor pipeline 90 (e.g. to perform data processing operations) and volatile memory 11 (e.g. to store execution state corresponding to the data processing operations. The volatile memory 11 can, for example, include one or more registers 92, one of which (e.g. a link register) may, during the checkpointing process, store an execution restart address to be read if the power-restore signal is received without the power first dropping below the minimum operating voltage. It should be noted that execution state may instead (or in addition) be stored in volatile memory outside of the CPU 10.

Also shown in FIG. 9 is a direct memory access (DMA) controller 94. A DMA controller 94 performs accesses to the NVM 12 based on configuration information set in response to commands issued by the CPU 10. In some examples of the present technique, the DVM 94 may also perform the checkpointing process (e.g. instead of the CPU 10 performing the checkpointing process). Hence, the DMA controller can provide dedicated hardware to perform the checkpointing process. Moreover, in the example of FIG. 9, the DMA 94 is a multi-channel DMA (MCDMA) controller, comprising multiple channels 96, which can be configured to perform a number of independent channels of DMA data transfers. Memory accesses can be issued for more than one channel at a time—this enables performance to be improved because while the DMA is waiting for data to be returned in response to a read request issued for one channel of DMA transfer, it can be requesting memory operations for another channel. When used for checkpointing, the transfer of the different data sections of the execution state can be allocated to the multiple channels, to improve the throughput of the checkpointing operations. Each of the channels used in the checkpointing process is hence responsible for preforming memory access operations to store its corresponding data section. It will be appreciated that the number of channels of the MCDMA controller and the number of data sections need not be the same. For example, if there are more data sections than channels, some or all of the channels may be allocated data storage operations corresponding to more than one data section, while if the number of data sections is smaller than the number of channels, some channels may not be used for checkpointing.

In some examples, each channel may also be configured to update, once the rest of the execution data in the corresponding data section has been stored, the checkpoint-progress status and/or an execution restart address to the NVM 12. For example, the channel configuration data set by the CPU for a given channel may include specification of an address in NVM to be updated with the checkpoint-progress status indicator or execution restart address corresponding to storage of the corresponding data section being completed. Hence, the MCDMA controller provides a hardware-implemented approach to updating checkpoint-progress status and/or the execution restart address.

Figure 10:
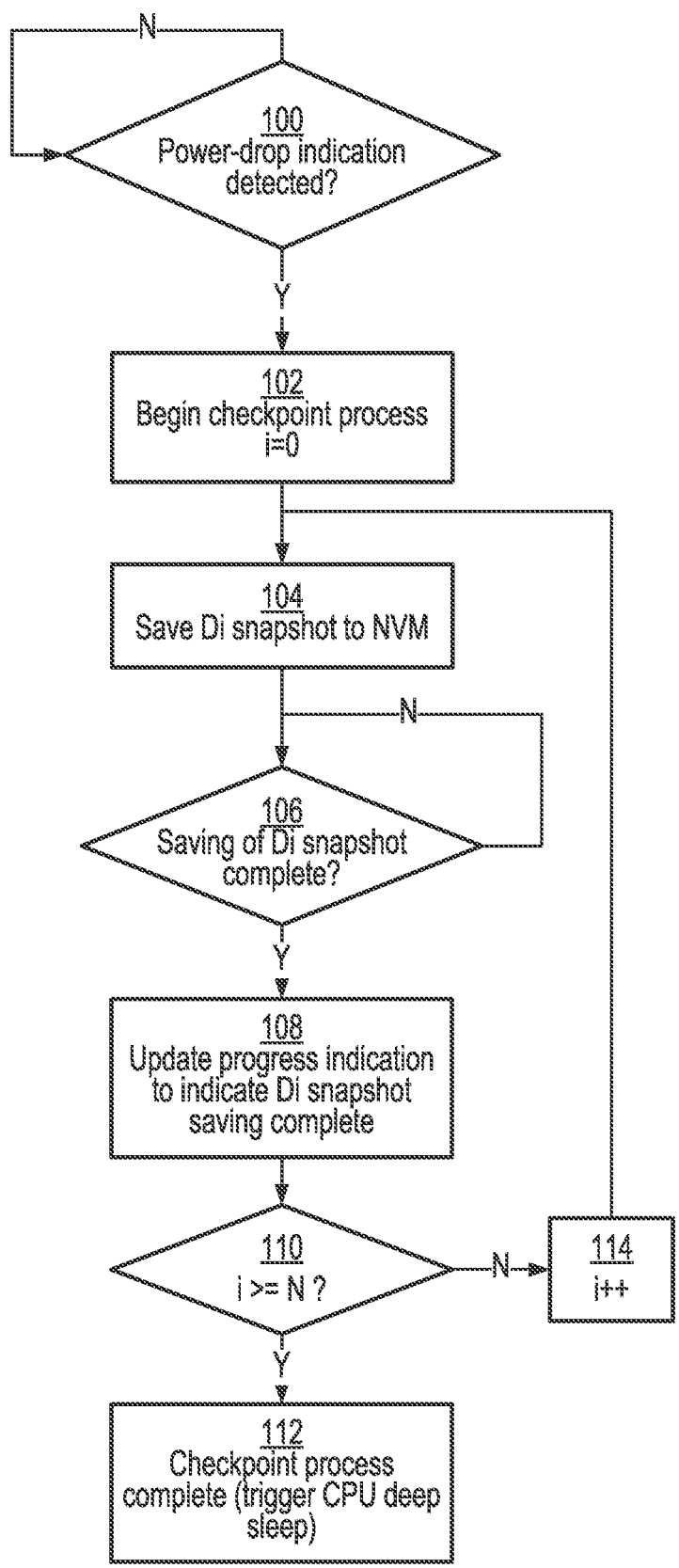
FIG. 10 is a flow diagram illustrating a method of responding to a power-drop warning.

FIG. 10 is a flow diagram illustrating a method performed by the CPU or by the MCDMA controller in response to a power-drop warning. When a power-drop warning (e.g. voltage drop warning or voltage warning) is detected 100, the checkpointing process begins 102. The checkpointing process involves saving 104 a snapshot (or partial snapshot) of a given data section Di to the NVM. Once saving of the Di snapshot to the NVM has completed 106, the checkpoint-progress status (progress indication) is updated 108 in the NVM to indicate that the Di snapshot has been completely saved to the NVM. Then, if 110 there are no more data sections to store to the NVM (e.g. if i>=N—i.e. N+1 is the total number of data sections to store during the checkpointing process), the checkpointing process completes 112. At this point, the CPU may, optionally, be put into a sleep mode. On the other hand, if it is determined 110 that there are one or more data sections still to save to the NVM, the value of i is increased 114 by 1 (i++, which can also be represented as i+=1, means i=i+1) and the method returns to step 104. Hence, by applying the method of FIG. 10, the checkpoint-progress status is updated each time a data section is fully stored to the NVM.

It should be appreciated that, while FIG. 10 shows the data sections being stored to the NVM sequentially (e.g. in series, one after the other), it is also possible for multiple data sections to be stored to the NVM in parallel (e.g. in the example of the MCDMA controller described above, multiple channels of data transfer may occur in parallel).

Figure 11:
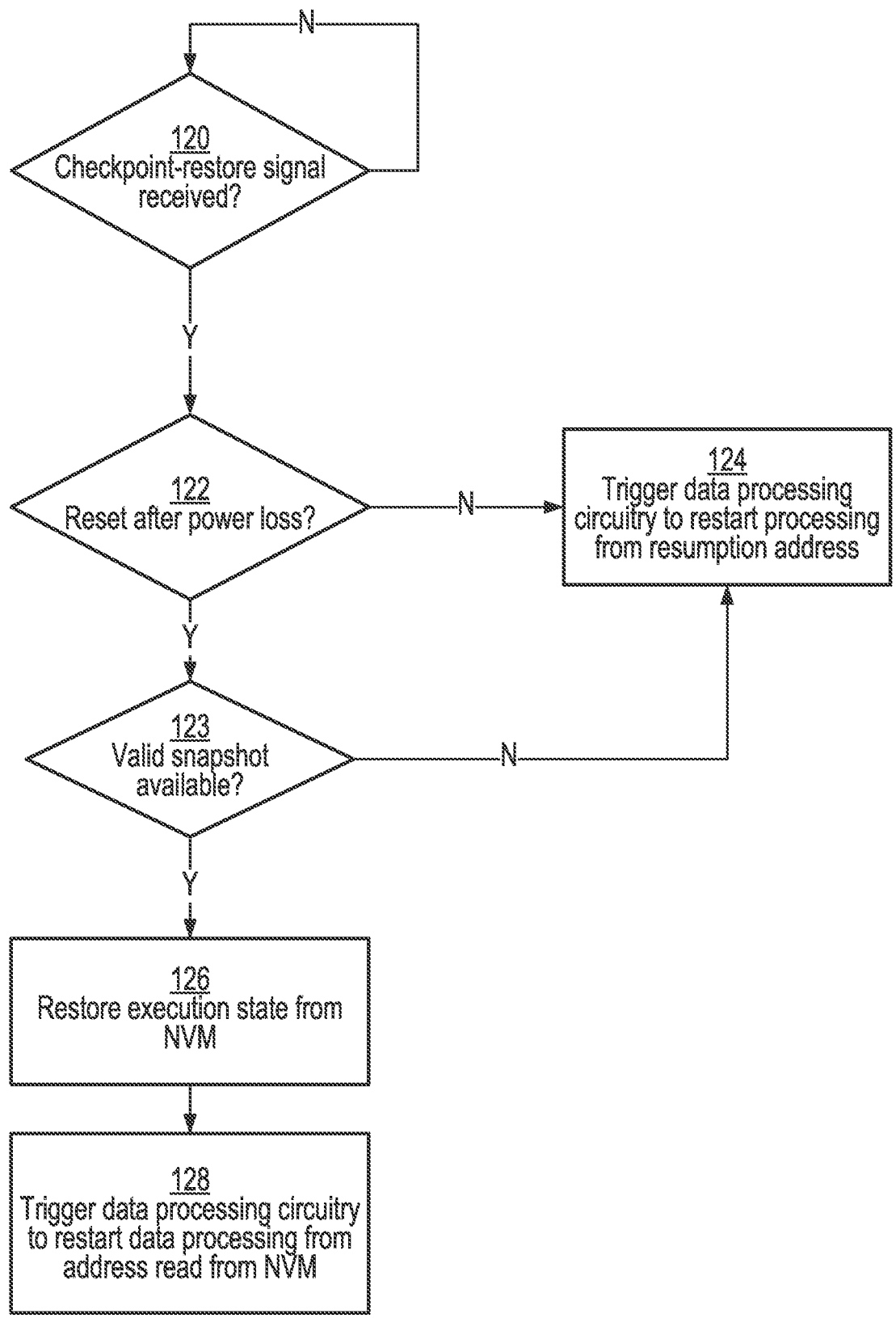
FIG. 11 is a flow diagram illustrating a method of responding to a checkpoint-restore signal.

FIG. 11 is another flow diagram, this time showing an example of a method performed by the data processing circuitry 90 of the CPU 10 in response to a checkpoint-restore signal. In this example, once a checkpoint-restore signal (which could be either a voltage OK signal or a POR signal) is received 120, it is determined 122 if the signal has been received after a power loss (e.g. if the CPU was asleep or in a power-saving mode immediately before receiving the checkpoint-restore signal, and hence the checkpoint-restore signal is the POR signal), or whether the power was still above the threshold level $V_{min}$ when the power-restore signal was received (e.g. if the checkpoint-restore signal is the voltage OK signal). If the power-restore signal has been received without the power having first dipped below the threshold level, there is no need to restore any execution state, since the execution state will still be maintained in the volatile memory. Similarly, if it is determined 123 that there is no valid snapshot stored in the NVM, there is no saved execution state that can be restored. Hence, in either case, the data processing circuitry is triggered 124 to restart processing from a resumption address (execution restart address)—for example, this could be an address read from a link register. On the other hand, if the power-restore signal has been received after a power loss (e.g. while the CPU is asleep), and if a valid snapshot is available in the NVM, the execution state is restored 126 from the snapshot or partial snapshot stored in the NVM, before the data processing circuitry is triggered 128 to restart data processing from an address (e.g. an execution restart address) read from the NVM.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

What is claimed is:

1. A method comprising:
   in response to a power-drop warning, performing a checkpointing process comprising storing, to a non-volatile memory, execution state associated with data processing operations performed by data processing circuitry; and
   maintaining, in the non-volatile memory, a checkpoint-progress status to indicate which of multiple sections of the execution state have been stored as part of the checkpointing process,
   wherein the checkpoint-progress status is suitable for enabling a partial checkpointing process in which each section of the multiple sections of the execution state is markable as valid or invalid independently of other sections of the multiple sections.

2. The method of claim 1, comprising
   in response to a power-restore signal, restoring the sections of the execution state that have been stored as part of the checkpointing process.

3. The method of claim 1, wherein
   the checkpoint-progress status is maintained in the non-volatile memory by the data processing circuitry executing checkpointing software.

4. The method of claim 1, wherein
   the checkpointing process is performed by checkpointing circuitry; and
   the checkpoint-progress status is updated in the non-volatile memory by the checkpointing circuitry.

5. The method of claim 4, wherein
   the checkpointing circuitry comprises a multi-channel direct memory access (DMA) controller; and
   the method comprises:
   configuring the multi-channel DMA controller to perform the checkpointing process; and
   allocating memory storing operations corresponding to at least two of the multiple sections of the execution state to different channels of the multi-channel DMA controller.

6. The method of claim 1, comprising
   in response to a power-restore signal, triggering the data processing circuitry to resume processing from an execution restart address,
   wherein the execution restart address comprises one of a plurality of possible execution restart addresses, each corresponding to completing storing of a different section of the execution state to the non-volatile memory.

7. The method of claim 6, comprising
   storing the execution restart address in the non-volatile memory during the checkpointing process.

8. The method of claim 7, comprising
   updating the execution restart address in the non-volatile memory following completion of storing of each of at least two of the multiple sections of the execution state to the non-volatile memory.

9. The method of claim 6, wherein
   the checkpoint-progress status comprises the execution restart address.

10. The method of claim 6, comprising
    determining the execution restart address by looking up an entry of a lookup table based on the checkpoint-progress status.

11. The method of claim 1, comprising
    determining, based on the checkpoint-progress status, whether storing of one or more of the multiple sections of the execution state can be omitted from a further checkpointing process performed in response to a further power-drop warning.

12. The method of claim 1, comprising:
    in response to a power-restore signal, performing a checkpoint-restore process comprising restoring the sections of the execution state that have been stored as part of the checkpointing process; and
    recording which of the restored sections are updated by the processing circuitry after performing the checkpoint-restore process.

13. The method of claim 12, comprising:
    in response to a further power-drop warning received after the performing the checkpoint-restore process, performing a further checkpointing process; and
    during the further checkpointing process, omitting storing sections of the execution state that where stored during the checkpointing process and not updated by the data processing circuitry following the checkpoint-restore process.

14. The method of claim 1, wherein
    the method is performed on an intermittent computing device.

15. The method of claim 1, wherein
    the method is performed on a device powered by energy harvested by the device.

16. A non-transitory storage medium storing a computer program which, when executed on a computer, causes the computer to perform the method of claim 1.

17. An apparatus for intermittent computing, the apparatus comprising:
    data processing circuitry to perform data processing operations; and
    checkpointing circuitry to perform, in response to a power-drop warning, a checkpointing process comprising storing, to a non-volatile memory, execution state associated with the data processing operations performed by the data processing circuitry,
    wherein the checkpointing circuitry is configured to maintain, in the non-volatile memory, a checkpoint-progress status to indicate which of multiple sections of the execution state have been stored as part of the checkpointing process, wherein the checkpoint-progress status is suitable for enabling a partial checkpointing process in which each section of the multiple sections of the execution state is markable as valid or invalid independently of other sections of the multiple sections.

* * * * *